United States Patent
Tyagi

Patent Number: 6,060,690
Date of Patent: May 9, 2000

[54] WELDING NOZZLE FOR IMPROVED GAS COVERAGE

[75] Inventor: Vichitra Tyagi, Montgomery, Ill.

[73] Assignee: Caterpillar Inc., Peoria, Ill.

[21] Appl. No.: 09/344,124

[22] Filed: Jun. 24, 1999

[51] Int. Cl.[7] .................................................. B23K 9/16
[52] U.S. Cl. ........................................ 219/137.42; 219/74
[58] Field of Search ............................. 219/137.42, 74, 219/75, 137.43, 137.31, 137.2

[56] References Cited

U.S. PATENT DOCUMENTS

| | | |
|---|---|---|
| 2,870,320 | 1/1959 | Mathews . |
| 3,148,263 | 9/1964 | Jensen . |
| 3,484,575 | 12/1969 | Cunningham ..................... 219/137.42 |
| 3,495,066 | 2/1970 | Broyard et al. . |
| 3,534,388 | 10/1970 | Ito et al. . |
| 3,597,576 | 8/1971 | Bernard et al. . |
| 3,604,889 | 9/1971 | Rohrberg . |
| 4,052,632 | 10/1977 | Sagara et al. . |
| 4,109,131 | 8/1978 | Schluter . |
| 5,132,512 | 7/1992 | Sanders et al. . |
| 5,235,155 | 8/1993 | Yamada et al. . |

*Primary Examiner*—Clifford C. Shaw
*Attorney, Agent, or Firm*—David M. Masterson

[57] ABSTRACT

A welding nozzle contains a plurality of orifices through which a shielding gas is directed. The shielding gas is routed by an inner member to flow directly onto the weld area in an axial direction through the inner member and in a radial direction through the plurality of orifices. The welding nozzle causes the shielding gas to completely surround the weld area and optimizes weld quality. This welding nozzle is particularly suited for use with a gas stream shielded arc welding device.

18 Claims, 4 Drawing Sheets

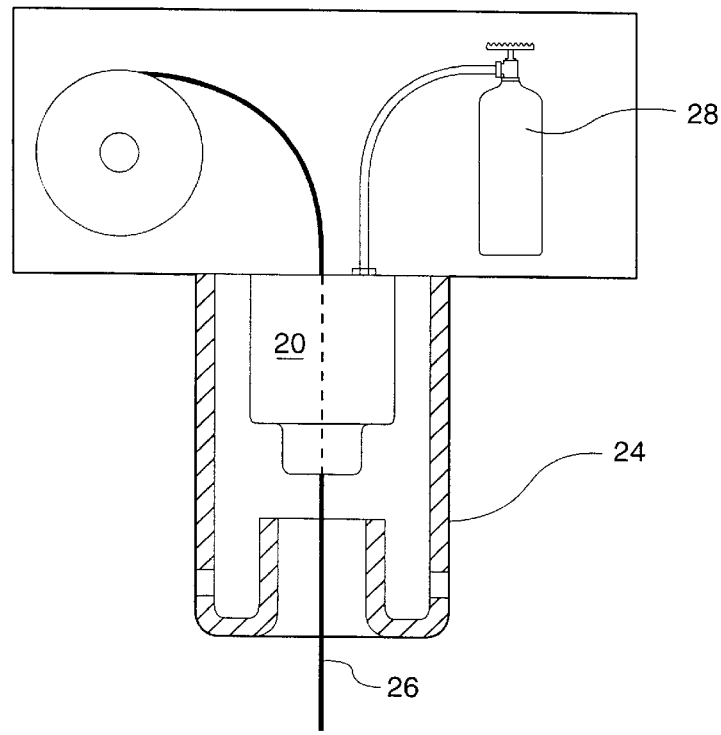
Fig-1-
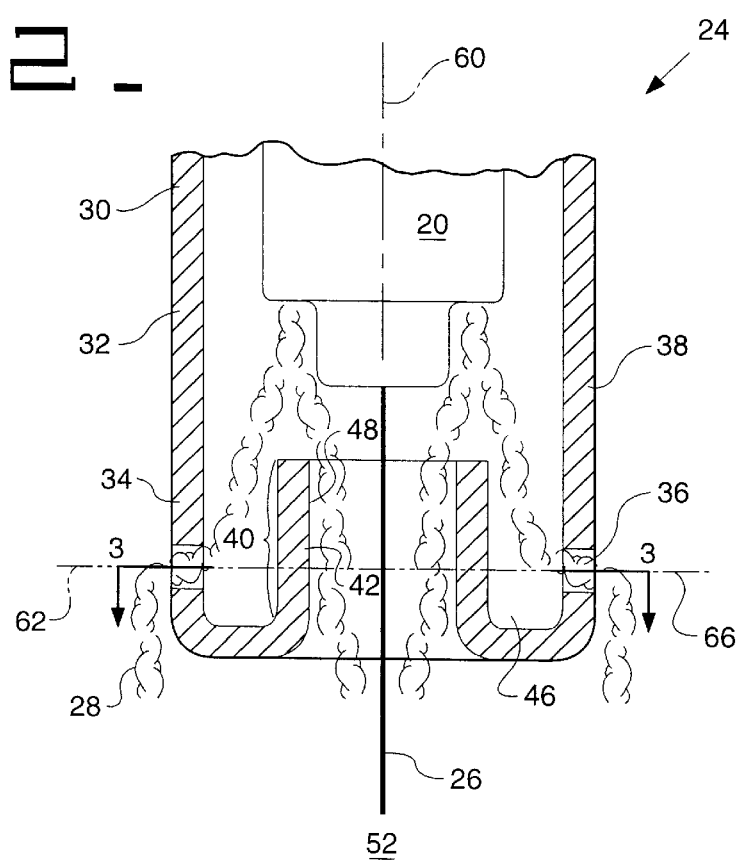
Fig-2-

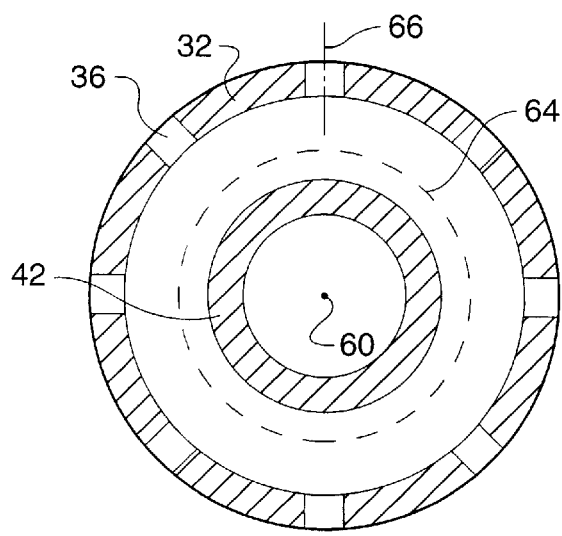
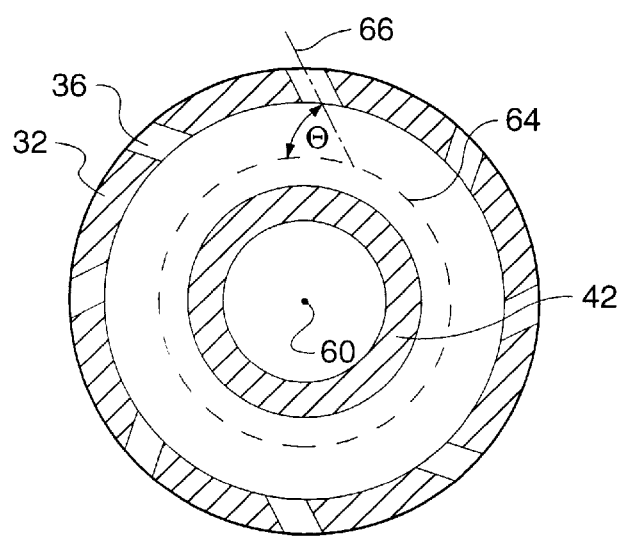

WELDING NOZZLE FOR IMPROVED GAS COVERAGE

TECHNICAL FIELD

This invention relates generally to a welding nozzle for use in a gas stream shielded arc welding device and more particularly to a welding nozzle that provides a method for improving shielding gas coverage.

BACKGROUND ART

Gas stream shielded arc welding devices are commonly used for all types of welding tasks. A metallic wire providing the welding flux is fed from the machine through a nozzle. An electrical circuit is comprised of the wire and the workpiece to be welded, and as the wire contacts the workpiece, the circuit is completed. Consequently, as electrical current travels across the gap between the wire and the workpiece, the arc heats the wire to a melting point. The wire is controlled by the welder through the use of a hand-held welding nozzle. This nozzle also directs the flow of a shielding fluid such as an inert or protective gas from the welding machine. Various fluids can also be used for shielding purposes, but hereinafter, all shielding fluids will be discussed in the context of a gas. This gas serves to shield the molten metal from oxidation until the weld cools and hardens, and also may help lessen any explosion hazard by protecting the hot weld area from outside gases. This method and apparatus for gas stream shielded arc welding is well known in the art, as shown, for example, in U.S. Pat. No. 2,870,320, issued to H. H. Mathews on Jan. 20, 1959.

The welding nozzle is the subject of interest in the present invention. A welding nozzle is normally replaced fairly frequently because of wear, and as such is considered reasonably disposable. The welding nozzles are normally made of metallic materials, but this is not a requirement. There also exist various styles of nozzles for differing welding applications.

Since shielding gas coverage directly impacts the manufacture of a quality weld, the directing of this gas is also quite important. Because the gas flows under pressure, the gas is constantly displacing outside air from the weld area. The displacement of outside air provides for the weld to harden and cool in an inert atmosphere to produce a strong and lasting weld.

There exist many different styles of welding nozzles which aim to maximize the coverage of the shielding gas while using a limited amount of the gas in order to keep the welding process cost-effective. Reference is made to a style of welding nozzle disclosed in U.S. Pat. No. 3,495,066 issued Feb. 10, 1970 to Y. Broyard et al, in which the shielding gas is simply forced through the bore of the welding nozzle and thus onto the weld area. The main disadvantage of this method is that the gas tends to blow away from the weld area very quickly, thus requiring a large volume of gas to adequately shield the weld area from oxidation.

Another common welding nozzle design is disclosed in the '320 patent, which uses separate passageways to direct the shielding gas through angled (in this case, right-angled) orifices in the end portion of the welding nozzle to induce a swirling aspect to the shielding gas as it exits from the welding nozzle. The vortex thus formed prevents the gas shield near the weld area from dissipating as quickly as a non-swirling shield, but leaves the center of the vortex relatively calm and may provide an opportunity for outside air to contaminate the weld area.

The present invention is directed to overcoming one or more of the problems as set forth above.

DISCLOSURE OF THE INVENTION

In one aspect of the present invention, an apparatus for the guiding of welding wire and shielding gas from a gas stream shielded arc welding device is disclosed. Included is an outer member having a hollow tubular body, a first end portion, a second end portion, and a plurality of orifices; and an inner member having a hollow tubular body, a first end portion, and a second end portion. The outer member connects in a known removable, usually screw threadable, manner to the arc welding device via the first end portion, and the first end portion of the inner member is connected in a fluidtight manner to the second end portion of the outer member. The second end portion of the inner member terminates at a point midway between the first and second end portions of the outer member. A wire holder is a part of the arc welding device, and the welding wire and shielding gas are conveyed to the welding nozzle through the wire holder. The welding nozzle attaches to the arc welding device in such a way that the wire holder is completely encircled by the welding nozzle.

The welding wire is fed by the arc welding device through the wire holder and to the weld area through the welding nozzle. The shielding gas is pressurized to flow through the wire holder, and the welding nozzle provides direction for the shielding gas to form a continuous shield substantially around the weld area.

BRIEF DESCRIPTION OF THE DRAWINGS

FIG. 1 is a general schematic example of the relation of the welding nozzle to the other components of the gas stream shielded arc welding device;

FIG. 2 is a cross-sectional view of an embodiment of the present invention;

FIG. 3 is a partial cross-sectional view taken along line 3—3 of FIG. 2;

FIG. 4 is a partial cross-sectional view of another embodiment of the present invention taken along line 3—3 of FIG. 2;

FIG. 7b is a partial cross-sectional view along line 7b—7b of FIG. 7a of the embodiment shown in FIG. 7a.

BEST MODE FOR CARRYING OUT THE INVENTION

Figure 5:
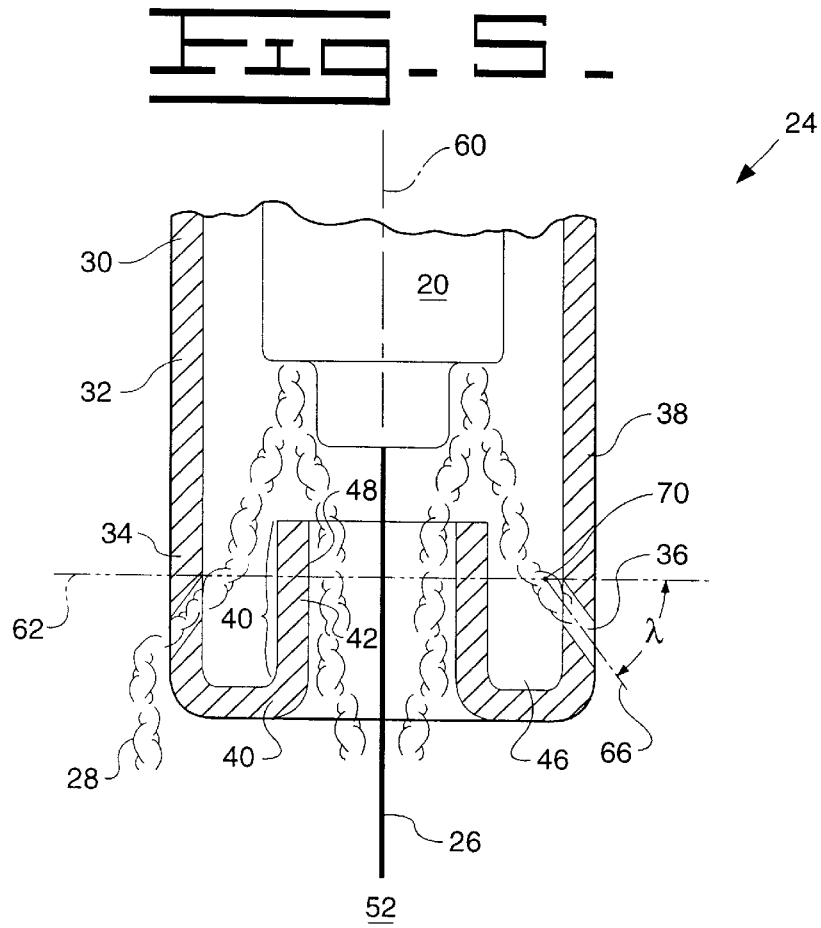
FIG. 5 is a cross-sectional view of another embodiment of the present invention.

Referring to FIGS. 1 and 2, a wire holder 20 protrudes from a gas stream shielded arc welding device 22. The welding nozzle 24 attaches to the arc welding device 22 in such a manner that the wire holder 20 is wholly enclosed within the welding nozzle 24. The welding wire 26 and shielding gas 28 are supplied from the arc welding device 22 through the wire holder 20. An outer member 32 has a first end portion 30 which removably attaches in a known manner to the arc welding device 22, usually through the use of a screw threadable method. The outer member 32 has a hollow tubular body 38, and a second end portion 34 spaced apart from the first end portion 30. The second end portion 34 is perforated by a plurality of orifices 36 disposed circumferentially about the second end portion 34. An inner member 42 is disposed within the outer member 32 and has a first end portion 40 which is fixedly attached in a fluidtight manner to the second end portion 34 of the outer member 32 and defines a continuous predetermined gap 46 between the inner and outer members 42,32. This attachment can be performed by brazing if the welding nozzle 24 is made of a metallic material. A second end portion 48 of the inner member 42 terminates between the first and second end portions 30,34 of the outer member 32. The inner member 42 has a hollow tubular body 50 which is adapted to surround the welding wire 26. The first end portion 40 of the inner member 42 is operative to direct a portion of the flow of shielding gas 28 from the direction of the first end portion 30 of the outer member 32. This portion of the shielding gas 28 does not flow through the hollow tubular body 50 of the inner member 42, but is directed onto a weld area 52 through the plurality of orifices 36.

The configuration of the plurality of orifices 36 is of particular interest in the present invention. For example, several configurations of the plurality of orifices 36 are described herein, and each configuration has advantages toward providing a shield of gas 28 around the weld area 52. For ease of discussion, a reference axis 60 is defined along the axis of the welding nozzle 24 and extends between and parallel to the first and second end portions 30,34 of the outer member 32. A reference plane 62 is defined perpendicular to the reference axis 60, and a reference circle 64 is defined encircling the reference axis 60 and located wholly in the reference plane 62. Each of the plurality of orifices 36 defines a longitudinal axis 66 extending though the outer member 32. The reference axis 60, reference plane 62, reference circle 64, and longitudinal axis 66 are used to simplify explanation of each configuration of the plurality of orifices 36.

As shown in FIGS. 2 and 3, in a first embodiment of the present invention, the plurality of orifices 36 each has the longitudinal axis 66 radially directed from the reference axis 60 and located wholly in the reference plane 62.

As shown in FIG. 4, in another embodiment of the present invention, the plurality of orifices 36 each has the longitudinal axis 66 wholly in the reference plane 62, much like the configuration shown in FIG. 2. Each longitudinal axis 66 is located at a tangential angle θ to the reference circle 64. The tangential angle θ can be any acute angle, but has a preferred value of between about 30 to 60 degrees.

In another embodiment of the present invention, shown in FIG. 5, the plurality of orifices 36 each includes the longitudinal axis 66 directed radially away from the reference axis 60. Each longitudinal axis 66 is also defines an angle λ from the reference plane 62. The angle λ should be an acute angle as well, preferably with a value between about 30 to 60 degrees.

Figure 6:
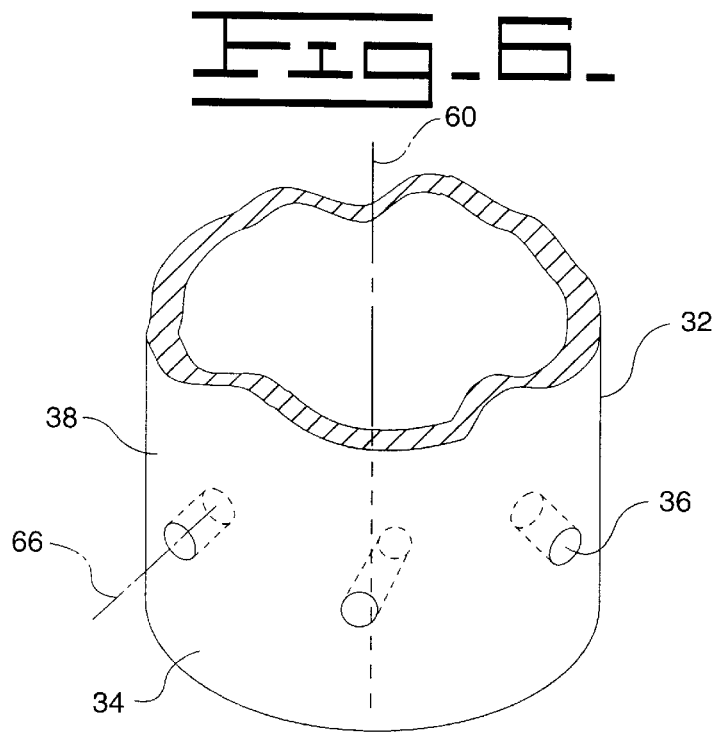
FIG. 6 is a partial cross-sectional side view of another embodiment of the present invention.

FIG. 6 shows another embodiment of the present invention, which combines features of the embodiments shown in FIGS. 4 and 5. Each of the plurality of orifices 36 defines the longitudinal axis 66 at the tangential angle θ to the reference circle 64, as in FIG. 4. Each longitudinal axis 66 is also at the angle λ from the reference plane 62. The angle λ has an apex 70 that is formed at the intersection of the longitudinal axis 66 and the reference plane 62, and this apex 70 is disposed in the direction of the first end portion 30 of the outer member 32.

Figure 7A:
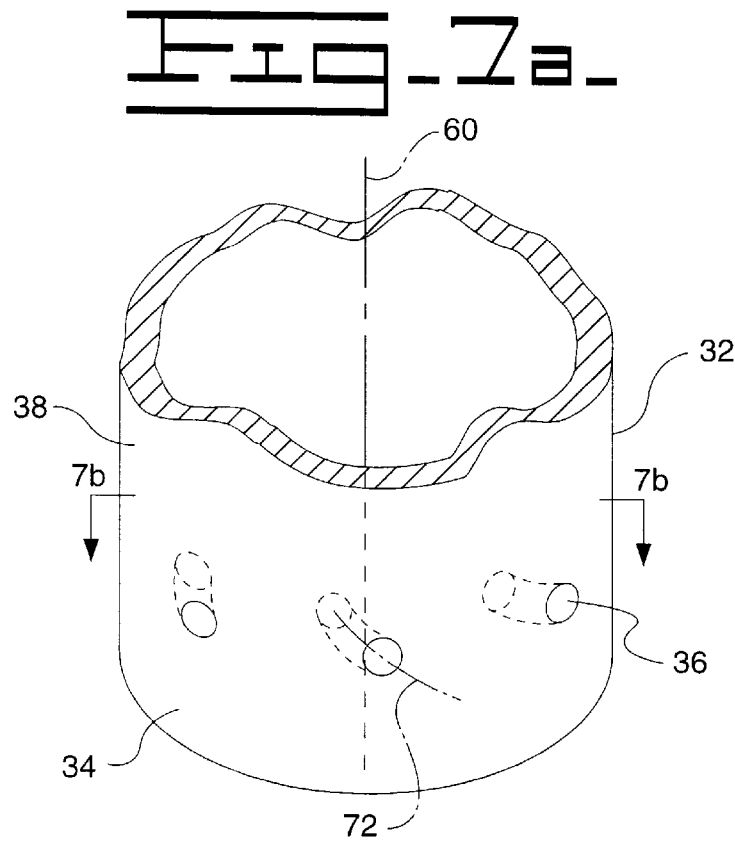
FIG. 7a is a partial cross-sectional side view of another embodiment of the present invention.
Figure 7B:
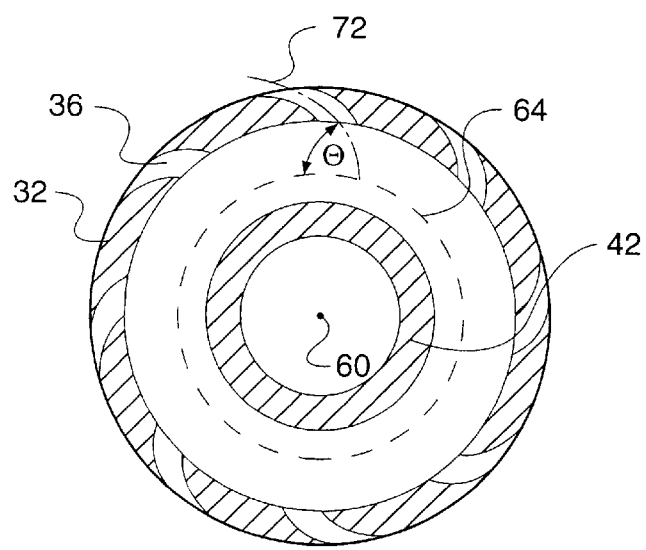

FIGS. 7a and 7b show yet another embodiment of the present invention. This embodiment is similar to that shown in FIG. 6. However each orifice of the plurality of orifices 36 defines an arcuate axis 72. The arcuate axis 72 of each of the plurality of orifices 36 extends through the outer member 32 and is roughly at a tangential angle θ to the reference circle 64. Each arcuate axis 72 is also roughly at an angle λ from the reference plane 62. However, the arcuate axis 72 of each of the plurality of orifices 36 has a predetermined curvature such that each arcuate axis 72 of the plurality of orifices 36 is spirally wound inside the hollow tubular body 38 of the outer member 32.

Industrial Applicability

The present invention consists of a welding nozzle 24 which directs shielding gas 28 through the center of the welding nozzle 24 and around the nozzle 24 through a plurality of orifices 36 on the outer member 32 of the welding nozzle 24. Prior difficulties were caused by the supply of shielding gas 28 either only to a limited portion of the weld area 52 directly or only to the outer perimeter of the weld area 52. The present invention provides for a greater comprehensive coverage of shielding gas 28 over the weld area 52.

The present invention provides for the gas 28 to exit the nozzle 24 both directly onto the weld area 52 and to exit the nozzle 24 in an outward direction from the second end portion 34 of the outer member 32. The second end portion 48 of the inner member 42 is positioned in such a way that pressurized shielding gas 28 flows from the wire holder 20 straight onto the weld area 52. Further, the gap 46 partially diverts the gas 28 through the plurality of orifices 36 to shield the weld area 52. In some embodiments, the shielding gas 28 exits the nozzle 24 in a spiraling motion to form a vortex around the weld area 52 to further concentrate the gas 28 at the weld area 52 for shielding purposes.

In the embodiment shown in FIG. 4, the angular direction of the plurality of orifices 36 causes the shielding gas 28 to assume a spiraling aspect as it exits the plurality of orifices 36.

As shown in the embodiment in FIG. 5, the plurality of orifices 36 each have a longitudinal axis 66 which is disposed at an angle λ from the reference plane 62 to provide for pressurized shielding gas 28 to flow through the plurality of orifices 36 downward toward the weld area 52.

The embodiment containing a combination of the two angles (θ, λ), as shown in FIG. 6, causes the orientation of the plurality of orifices 36 to emphasize the spiraling aspect of the shielding gas 28 and cause a downward-directed swirling cone of gas 28 to exit the plurality of orifices 36.

The embodiment shown in FIGS. 7a and 7b provides the most clearly spiraling motion to the shielding gas 28 as the gas 28 flows through the plurality of orifices 36 in a generally curving manner. This embodiment is more difficult to manufacture than the other embodiments are because of the curvature of the plurality of orifices 36. This embodiment could thus be manufactured with a forming or casting method such as lost wax casting. Other aspects, objects, and advantages of this invention can be obtained from a study of the drawings, the disclosure, and the appended claims.

I claim:

1. A welding nozzle adapted for connection to a gas stream shielded arc welding device having a consumable welding wire extending therefrom and operative to distribute a flow of shielding gas from the arc welding device to a weld area, the welding nozzle comprising:

an outer member having a hollow tubular body, a first end portion being removably attachable to the arc welding device and a second end portion being spaced apart from the first end portion, the outer member defining a plurality of orifices disposed circumferentially about the second end portion; and an inner member being disposed within the hollow tubular body of the outer member and defining a continuous predetermined gap therebetween and having a hollow tubular body being adapted to surround the welding wire, a first end portion, and a second end portion terminating at a location between the first and second end portions of the outer member, the first end portion of the inner member being attached in a fluidtight manner to the second end portion of the outer member and operative to direct a portion of the flow of shielding gas from the direction of the first end portion of the outer member through the plurality of orifices of the second end portion of the outer member.

2. The apparatus, as set forth in claim 1, wherein the welding nozzle is fashioned from a metallic material.

3. The apparatus, as set forth in claim 2, wherein the first end portion of the inner member is brazed to the second end portion of the outer member.

4. The apparatus, as set forth in claim 1, wherein the welding nozzle attaches to the welding device in a screw threadable manner.

5. The apparatus, as set forth in claim 1, wherein the welding nozzle defines a reference axis extending between and parallel to the first and second end portions of the outer member, a reference plane perpendicular to the reference axis, and a reference circle encircling the reference axis and located wholly within the reference plane, each of the plurality of orifices defining a longitudinal axis extending through the outer member.

6. The apparatus, as set forth in claim 5, wherein each longitudinal axis of the respective ones of the plurality of orifices is disposed radially with respect to the reference axis and being located wholly in the reference plane.

7. The apparatus, as set forth in claim 6, wherein each longitudinal axis is defining an angle λ from the reference plane.

8. The apparatus, as set forth in claim 7, wherein the angle λ of the longitudinal axis of each one of the plurality of orifices with respect to the reference plane is an acute angle, and the angle λ has an apex formed by the intersection of the longitudinal axis and the reference plane, the apex of the angle λ being disposed in the direction of the first end portion of the outer member.

9. The apparatus, as set forth in claim 5, wherein each longitudinal axis of the respective ones of the plurality of orifices is disposed radially with respect to the reference axis and each longitudinal axis is disposed at a tangential angle θ to the reference circle, the longitudinal axis located wholly in the reference plane.

10. The apparatus, as set forth in claim 9, wherein each longitudinal axis is defining an angle λ from the reference plane.

11. The apparatus, as set forth in claim 10, wherein the angle λ of the longitudinal axis of each one of the plurality of orifices with respect to the reference plane is an acute angle, and the angle λ has an apex formed by the intersection of the longitudinal axis and the reference plane, the apex of the angle λ being disposed in the direction of the first end portion of the outer member.

12. The apparatus, as set forth in claim 10, wherein the plurality of orifices each defines an arcuate axis extending through the outer member, and each arcuate axis has a predetermined amount of curvature such that each orifice of the plurality of orifices takes on a spiraling aspect as the orifice cuts through the hollow tubular body of the outer member.

13. A welding nozzle adapted for connection to a gas stream shielded arc welding device having a consumable welding wire extending therefrom and operative to distribute a flow of shielding gas from the arc welding device to a weld area, the welding nozzle comprising:

an outer member having a hollow tubular body, a first end portion being removably attachable to the arc welding device and a second end portion being spaced apart from the first end portion, the outer member defining a plurality of orifices disposed circumferentially about the second end portion;

an inner member being disposed within the hollow tubular body of the outer member and defining a continuous predetermined gap (46) therebetween and having a hollow tubular body being adapted to surround the welding wire, a first end portion, and a second end portion terminating at a location between the first and second end portions of the outer member, the first end portion of the inner member being attached in a fluidtight manner to the second end portion of the outer member and operative to direct a portion of the flow of shielding gas from the direction of the first end portion of the outer member through the plurality of orifices of the second end portion of the outer member; and wherein the welding nozzle defines a reference axis extending through the center of the hollow tubular body of the outer member and the plurality of orifices being arranged perpendicular to the reference axis.

14. The apparatus, as set forth in claim 13, wherein each of the plurality of orifices is directed in a direction toward the second end portion of the outer member and away from the inner member.

15. A welding nozzle adapted for connection to a gas stream shielded arc welding device having a consumable welding wire extending therefrom and operative to distribute a flow of shielding gas from the arc welding device to a weld area, the welding nozzle comprising:

an outer member having a hollow tubular body, a first end portion being removably attachable to the arc welding device and a second end portion being spaced apart from the first end portion, the outer member defining a plurality of orifices disposed circumferentially about the second end portion;

an inner member being disposed within the hollow tubular body of the outer member and defining a continuous predetermined gap therebetween and having a hollow tubular body being adapted to surround the welding wire, a first end portion, and a second end portion terminating at a location between the first and second end portions of the outer member, the first end portion of the inner member being attached in a fluidtight manner to the second end portion of the outer member and operative to direct a portion of the flow of shielding gas from the direction of the first end portion of the outer member through the plurality of orifices of the second end portion of the outer member; and wherein the welding nozzle defines a reference axis extending through the center of the hollow tubular body of the outer member and a reference plane perpendicular to the reference axis, and wherein each of the plurality of orifices defines a longitudinal axis extending through the outer member, each longitudinal axis lying obliquely from the reference axis.

16. The apparatus, as set forth in claim 15, wherein each longitudinal axis is directed toward the second end portion of the outer member and away from the inner member.

17. A welding nozzle adapted for connection to a gas stream shielded arc welding device having a consumable welding wire extending therefrom and operative to distribute a flow of shielding gas from the arc welding device to a weld area, the welding nozzle comprising:

- an outer member having a hollow tubular body, a first end portion being removably attachable to the arc welding device and a second end portion being spaced apart from the first end portion, the outer member defining a plurality of orifices disposed circumferentially about the second end portion;
- an inner member being disposed within the hollow tubular body of the outer member and defining a continuous predetermined gap therebetween and having a hollow tubular body being adapted to surround the welding wire, a first end portion, and a second end portion terminating at a location between the first and second end portions of the outer member, the first end portion of the inner member being attached in a fluidtight manner to the second end portion of the outer member and operative to direct a portion of the flow of shielding gas from the direction of the first end portion of the outer member through the plurality of orifices of the second end portion of the outer member; and
- wherein the welding nozzle defines a reference axis extending through the center of the hollow tubular body of the outer member, each of the plurality of orifices being arranged about the reference axis and having a predetermined amount of curvature.

18. The apparatus, as set forth in claim 17, wherein each of the plurality of orifices is defined within the hollow tubular body of the outer member in a cylindrical spiral configuration.

* * * * *